United States Patent
Chen (10) Patent No.: US 10,710,355 B2
(45) Date of Patent: Jul. 14, 2020

(54) METHOD OF SLICING PRINTING COLOR 3D OBJECT WITH POSITION ERROR CORRECTION

(71) Applicants: XYZPRINTING, INC., New Taipei (TW); KINPO ELECTRONICS, INC., New Taipei (TW)

(72) Inventor: Chung-Ju Chen, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 370 days.

(21) Appl. No.: 15/454,748

(22) Filed: Mar. 9, 2017

(65) Prior Publication Data

US 2018/0133983 A1 May 17, 2018

(30) Foreign Application Priority Data

Nov. 17, 2016 (CN) .......................... 2016 1 1012153

(51) Int. Cl.
*B33Y 10/00* (2015.01)
*B33Y 50/02* (2015.01)
(Continued)

(52) U.S. Cl.
CPC ............ *B33Y 50/02* (2014.12); *B29C 64/153* (2017.08); *B29C 64/386* (2017.08); *B33Y 10/00* (2014.12); *B33Y 30/00* (2014.12)

(58) Field of Classification Search
None
See application file for complete search history.

(56) References Cited

U.S. PATENT DOCUMENTS

2006/0204867 A1* 9/2006 Leiser ................. H01L 21/4867
430/30
2013/0108726 A1* 5/2013 Uckelmann ......... B29C 67/0007
425/174.4
(Continued)

FOREIGN PATENT DOCUMENTS

CN 103341625 A 10/2013
WO 2015073301 A1 5/2015
(Continued)

OTHER PUBLICATIONS

Office Acton dated Jun. 5, 2019 of the corresponding China patent application.

*Primary Examiner* — Bernard G Lindsay
(74) *Attorney, Agent, or Firm* — Chun-Ming Shih; HDLS IPR Services (57) ABSTRACT

A method of slicing printing color 3D object and a color 3D printing system; the method includes following steps: execute a slicing process to a color 3D object for obtaining a plurality of layers of slice objects; analyze one of the pluralities of layers of the slice objects for generating sintering control data and color control data; lay a layer of powder; color the layer of powder according to the color control data; sinter the colored powder according to the sintering control data for completing printing one layer of the slice objects; perform repeatedly above steps until all layers of the slice objects are printed and a color stereoscopic physical model is generated. The method can effectively generate a color stereoscopic physical model. In addition, because of the adoption of laser sintering technology, the color stereoscopic physical model generated by the present disclosed example has great strength.

7 Claims, 10 Drawing Sheets

(51) Int. Cl.
*B33Y 30/00* (2015.01)
*B29C 64/153* (2017.01)
*B29C 64/386* (2017.01)

(56) References Cited

U.S. PATENT DOCUMENTS

2017/0151726 A1* 6/2017 Ikeda ................ B29C 67/00
2017/0368753 A1* 12/2017 Yang ................ G01B 21/20
2018/0136632 A1* 5/2018 Ochiai ................ B33Y 50/02
2018/0370118 A1* 12/2018 Jiang ................ B29C 41/00
2019/0134747 A1* 5/2019 Herzog ................ G05B 19/401

FOREIGN PATENT DOCUMENTS

WO 2016175813 A1 11/2016
WO WO 2017148100 * 9/2017 ............. B29C 41/00

* cited by examiner

METHOD OF SLICING PRINTING COLOR 3D OBJECT WITH POSITION ERROR CORRECTION

BACKGROUND OF THE INVENTION

Field of the Invention

The technical field relates to the method of slicing printing 3D object and a 3D printer, and more particularly relates to the method of slicing printing color 3D object and a color 3D printing system.

Description of Related Art

Currently, a type of Selective Laser Sintering 3-dimensions printer, SLS 3D printer is invented. While in printing, current SLS 3D printer paves a layer of powder, and uses the powder paved by laser sintering to solidify the powder into one-layer slice model. Next, a layer of powder is paved on the solidified slice model. Laser is applied to sinter powder to form another slice model on the slice model. Repeat the above-mentioned operations, and a 3D physical model piled by a plurality of layers of slice object may be formed. In addition, the formed 3D physical model generated by the above-mentioned sintering has extreme model strength, not easily broken or deformed.

Although current SLS 3D printers have the above-mentioned advantages, owing to its mere capability to make single-colored 3D physical model, current SLS 3D printers cannot meet the demand of users for color 3D physical models.

In addition, there is another type of powder bed and inkjet head 3D printer proposed. While in printing, such powder bed and inkjet head 3D printers pave a layer of powder, and use color ink and cohesive to dye and stick powder to make one-layered color slice model. Then, a layer of powder is paved again on the slice model. Repeat the above-mentioned operation continually, and a color 3D physical model piled by the color plurality of layers of slice model may be formed.

Although current powder bed and inkjet head 3D printers can generate color 3D models, the strength of the color 3D physical models made by the way of sticking is not good, and is likely to break or deform.

SUMMARY OF THE INVENTION

The disclosure is directed to a method of slicing printing color 3D object and a color 3D printing system, which may use laser sintering technology to generate color 3D physical models.

In one embodiment, a method of slicing printing color 3D object, used in a color 3D printing system, the color 3D printing system comprising a powder-paving module, a color jet printing module, and a laser module, the method comprises:

a) executing a slicing process on a color 3D object to obtain a plurality of layers of slice objects, b) analyzing the plurality of layers of slice objects, and generating sintering control data and color control data corresponding to the plurality of layers of the slice objects;

c) controlling the powder-paving module to pave a layer of powder;

d) controlling the color jet printing module to color the paved layer of powder according to the color control data;

e) controlling the laser module to sinter the layer of dyed powder according to the sintering control data, to complete printing a layer of the slice object; and f) repeating Step c) to Step e) until the plurality of layers of slice objects is printed.

In another embodiment, a method of slicing printing color 3D object used in a color 3D printing system, the color 3D printing system comprising a powder-paving module, a color jet printing module, and a laser module, the method comprises:

a) executing a slicing process on a color 3D object to obtain a plurality of layers of slice objects;

b) analyzing the plurality of layers of slice objects and generating one sintering control data and color control data corresponding to the plurality of layers of slice objects;

c) controlling the powder-paving module to pave a layer of powder;

d) according to the sintering control data, controlling the laser module to sinter the layer of powder;

e) according to the color control data, controlling the color jet printing module to color the generated slice physical model to complete printing one layer of the slice object; and f) repeating Step c) to Step e) until printing of the plurality of slice objects is completed.

In another embodiment, a color 3D printing system comprises:

a connector module for receiving sintering control data and color control data corresponding to a plurality of layers of slice objects of a color 3D object from an electronic device;

a powder-paving model for paving powder;

a laser model for sintering the powder according to the sintering control data;

a color printing model for printing ink according to the color control data; and a control module for electrically connecting the connector module, the powder-paving module, the laser module, and the color jet printing module, wherein the control module determines a control time sequence under a printing mode, repeatedly controlling the powder-paving module, the laser module, and the color jet printing module to print the plurality of layers of slice objects layer by layer to generate a color 3D physical model based on the control time sequence.

The embodiments may effectively generate a color 3D physical model.

In addition, because of the adoption of the laser sintering technique, the color 3D physical model generated by the present disclosed example has extreme strength. The following illustrates the present disclosed example in detail combined with attached Figures and embodiments.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION

The following disclosure combines drawings and specific implement methods to describe the technology projects of the present disclosed example in detail, for explaining more of the goal, program and effect, but doesn't serve as the limit of the protection scope of the attached claims of the present disclosed example.

Figure 1:
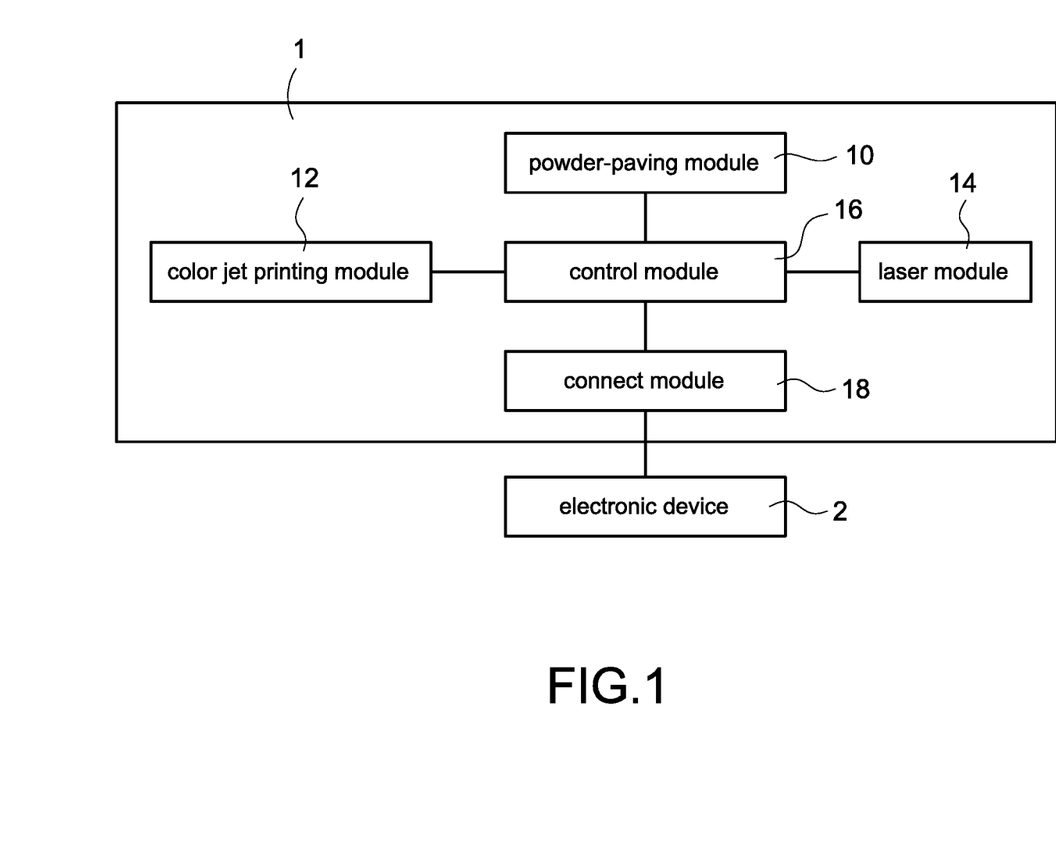
FIG. 1 is the framework of the color 3D printing system in the first embodiment of the present disclosed example.

Please refer to FIG. 1 as the framework of the color 3D printing system in the first embodiment of the present disclosed example. Embodiments include a color 3D printing system 1, called color 3D printer 1 in the following, can effectively implement laser sintering technology and color jet printing technology to generate the color 3D physical model.

Concretely speaking, when users want to print a set of color 3D object with the form of electronic data, they can execute the slicing program in the computer devices, such as electronic device 2, to connect slicing process on the previously mentioned color 3D object to cut the previously mentioned 3D object into the plurality of layers of slice object, and execute the conversion program to execute analyzing process on the plurality of layers of slice object to generate sintering control data and color control data used to control printing. Finally, users can operate computer devices to transmit the previously mentioned sintering control data and color control data to 3D printer 1 to physicalize the color 3D object.

A 3D printer 1 in the embodiment mainly comprises powder-paving module 10, color jet printing module 12, laser module 14, connector module 18, and control module 16 which electronically connects above-mentioned components.

The connector module 18 is used to connect electronic device 2, such as personal computers or external storage devices, and to receive sintering control data and color control data from electronic device 2. In an embodiment, sintering control data is used to control laser module 14 to execute printing; color control data is used to control color jet printing module 12 to execute printing.

In an example, the connector module 18 may be a wire connector module or wireless connector module. The wire connector module can be USB module or PCI bus module; wireless connector module can be Wi-Fi module or Bluetooth module. However, it shouldn't be within the limit.

In another embodiment, the electronic device 2 is removable storage media, such as memory cards or disks. The connector module 18 connects electronic device 2 to acquire sintering control data and color control data via media reading devices, such as card readers or CD-ROM drives.

Concretely speaking, the previously mentioned powder presents in the form of flux because its temperature reaches the fluxing temperature during sintering, and stops sintering because its temperature is lower than the fluxing temperature and then materializes.

In an example, the previously mentioned powder may be plastic powder, metal powder, or other thermoplastic powder. Plastic powder can be Polystyrene "PS", Acrylonitrile Butadiene Styrene "ABS", or Nylon. Metal powder can be copper, lead, or tin, but it shouldn't be within the limit.

The color jet printing module 12 jet prints ink according to the color control data.

The control module 16 can enter printing-embodiment once receiving the sintering control data and color control data. Under the printing mode, the control module 16 can determine the control time sequence, and repeatedly control powder-paving module 10, laser module 14, and color jet printing module 12 to print plurality of layers of slice objects layer by layer based on the determined control time sequence. In an example, control module 16 is the System on Chip, "SoC".

Figure 2:
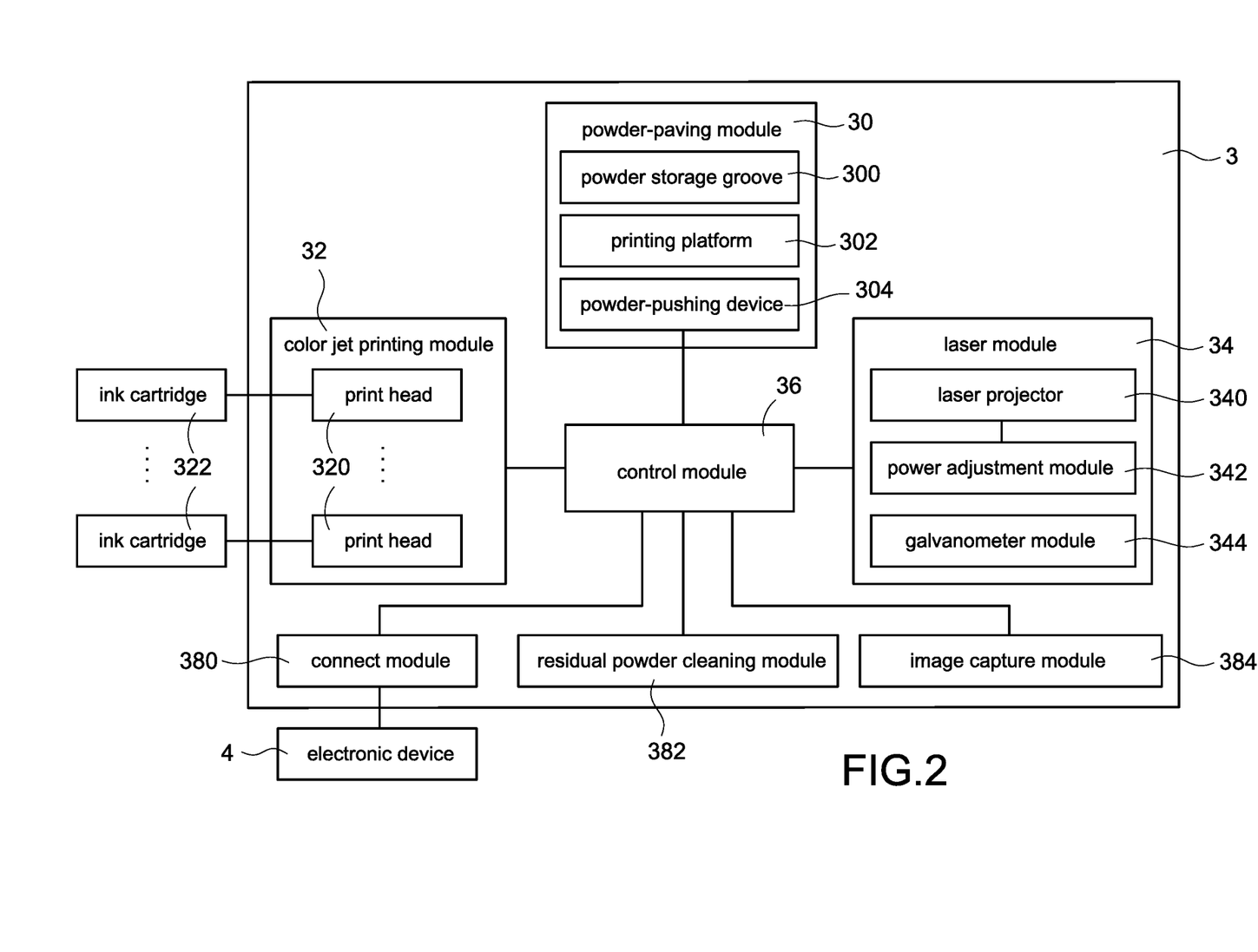
FIG. 2 is the framework of the color 3D printing system in the second embodiment of the present disclosed example.

Please go on to refer to FIG. 2 as the framework of the color 3D printing system in the second embodiment of the present disclosed example. The color 3D printing system 3, called 3D printer 3 in the following, in the embodiment has powder-paving module 30, color jet printing module 32, laser module 34, control module 36, connector module 380, and electronic device 4. It corresponds to 3D printer 1 shown in the first embodiment of FIG. 1, powder-paving module 1, color jet printing module 12, laser module 14, control module 16, connector module 18, and electronic device 2 respectively. In addition, in the following explanation, simply differences between the two embodiments will be explained.

In the embodiment, powder-paving module 30 comprises powder storage groove 300. Powder storage groove 300 is used to store and supply powder; powder-pushing device 304 is used to push powder onto printing platform 302 to color and sinter.

The color jet printing module 32 comprises plural print head 320. Plural print head 320 connects cartridge 322 which stores different color inks respectively. Color jet printing module 32 can determine toning proportion according to the color control data, and control plural print head 320 to jet print different color inks according to the determined toning proportion. In an example, the previously mentioned toning proportion is to correspond to the object colors of the current printed slice object.

Laser module 34 comprises laser transmitter 340, power adjustment module 342 of electricity connection laser transmitter 340, galvanometer module 344. Laser transmitter 340 is used to transmit laser to sinter powder; powder adjustment module 342 is used to control the output power of laser; galvanometer module 344 is used to control the projection position of laser.

3D printer 3 in the embodiment also comprises residual powder cleaning module 382 and image capture module 384 of electricity connection control module 36. Residual powder cleaning module 382 is used to clean the residual powder on the printing platform 302 after printing. Image capture module 384 is used to shoot the operation condition of color jet printing module 32 and laser module 34 to execute correction (discussed in detail later).

Figure 3:
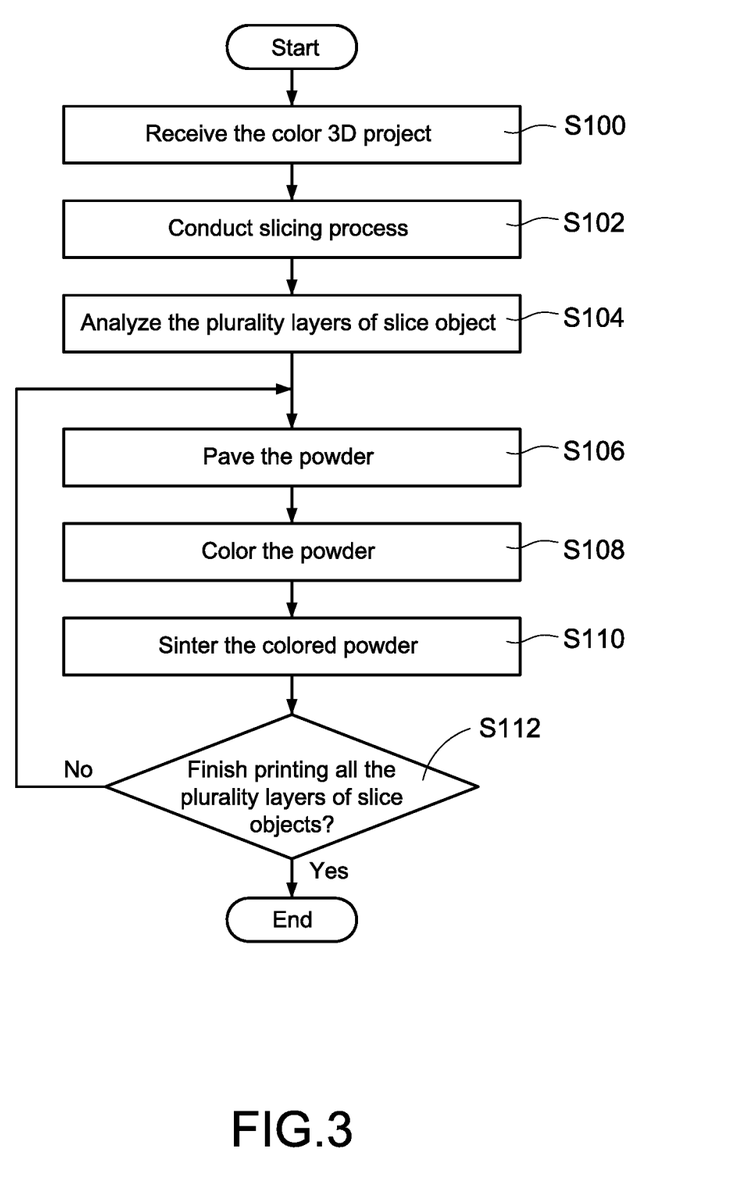
FIG. 3 is the flow chart of the method of slicing printing color 3D object in the first embodiment of the present disclosed example.

Please go on to refer to FIG. 3 as the flow chart of the method of slicing printing color 3D object in the first embodiment of the present disclosed example. The method of slicing printing color 3D object in the embodiment can be implemented in 3D printer 1 shown in FIG. 1 or 3D printer 3 shown in FIG. 2. The following will take 3D printer shown in FIG. 1 for example to explain. The method of slicing printing color 3D object in the embodiment comprises the following steps.

Step S100: electronic device 2 receives color 3D object. Concretely speaking, users can input electronically formed color 3D object into electronic device 2.

Step S102: electronic device 2 executes slicing program to execute slicing process on the color 3D object to slice the color 3D object into plurality of layers of slice object. In an example, the previously mentioned slice object can be presented by adopting layer image.

Step S104: electronic device 2 analyzes the plurality of layers of slice object and generates the sintering control data and color control data which correspond to the plurality of layers of slice object. In an example, electronic device 2 can further pack the generated sintering control data and color control data into a single electronic file, and transmits it into 3D printer 1.

Step S106: control module 16 of 3D printer 1 controls powder-paving module 10 to pave a layer of powder. In an example, the amount of powder and the shape which powder-paving module 10 paves are fixed.

Step S108: control module 16 controls color jet printing module 12 to color the paved layer of powder according to the color control data. In an example, color jet printing module 12 jet prints designated colors of ink onto the layer of powder according to the color control data to make the layer of powder absorb ink and dyed as the designated color.

Step S110: control module 16 controls laser module 14 to sinter the colored layer of powder to materialize the layer of powder according to the sintering control data to finish printing a color slice object. Namely, the virtual color slice object is materialized as a color slice physical model.

What is worth mentioning is that laser module 14 sinters not all the paved powder but part of the paved powder according to the shape of the slice object recorded in the sintering control data to make the powder in the shape of the slice object.

In addition, because the embodiment colors the powder first and then executes sintering, the operating temperature of the ink (referring to the upper temperature limit in which ink can normally show the color) used in the embodiment is better and should be higher than the fluxing temperature of the powder to prevent the dyed powder from fade in the burning phase because of the high temperature.

For example, when using copper powder (with the fluxing temperature at 1083° C.), tin (with the fluxing temperature at 232° C.), or lead (with the fluxing temperature at 328° C.) as the printing powder, we can use glaze (with the highest operating temperature at 1200° C.) or ceramic pigment (with the highest operating temperature at 1200° C.) as the printing ink. When using PS (with the fluxing temperature at 240° C.), ABS (with the fluxing temperature at 105° C.), or Nylon (with the fluxing temperature at 180° C.) as the printing powder, we can use dye (with the highest operating temperature at 300° C.) or pigment (with the highest operating temperature at 230° C.) as the printing ink.

In addition, this embodiment colors the powder and then sinter, which makes powder absorbing ink evenly and makes the internal and external of the formed slice physical model present the ink color evenly.

Step S112: control module 16 determines whether all the slice objects are finished printing according to the sintering data and color control data. If control module 16 determines that there is anyone slice object unprinted, then carry out Step S106 to S110 again to print the next slice object. If control module 16 determines that all the slice objects are finished printing, which means color 3D physical models have been generated, then control 3D printer 1 to end the printing.

The embodiments can generate color 3D physical models effectively. In addition, thanks to the adoption of laser sintering technology, the color physical model generated by the embodiment has extreme strength.

Figure 4:
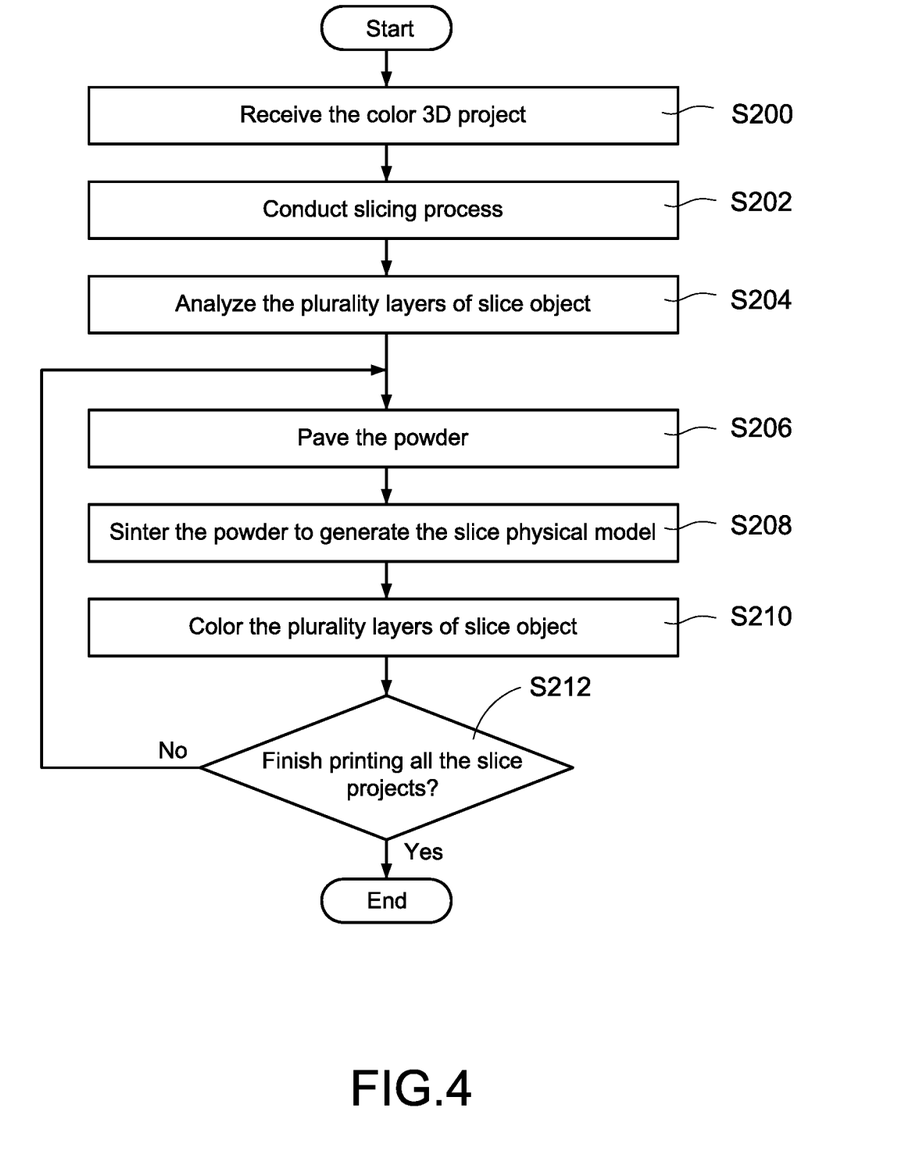
FIG. 4 is the flow chart of the method of slicing printing color 3D object in the second embodiment of the present disclosed example.

Please go on to refer to FIG. 4, which is the flow chart of the method of slicing printing color 3D object in the second embodiment of the present disclosed example. The method of slicing printing color 3D object can be implemented in 3D printer 1 in FIG. 1 or 3D printer 3 in FIG. 2. The following will illustrate by taking 3D printer 1 in FIG. 1 for example.

Steps S200-S206, S212 in the embodiment are similar to S100-S106, S112 in the first embodiment of FIG. 3. The difference between this embodiment and the first embodiment is that this embodiment sinters first, and then colors. The detailed explanations go as follows.

Step S208: control module 16 of 3D printer 1 controls laser module 14 to sinter the layer of powder to solidify the layer of powder according to the sintering control data to finish printing a layer of slice object and form a layer of slice physical model.

Step S210: control module 16 controls color jet printing module 12 to color the formed slice physical model according to the color control data. In an example, color jet printing module 12 jet prints the designated color ink on the exterior of the slice physical model according to the color control data.

What is worth mentioning is that the embodiment sinters first and then colors, so the temperature of the formed slice physical model has decreased in such a great extent that most inks are applicable when coloring. Therefore, in the mode, even if the highest working temperature of the used inks is not higher than the fluxing temperature of the powder, coloring can smoothly be done.

Figure 5:
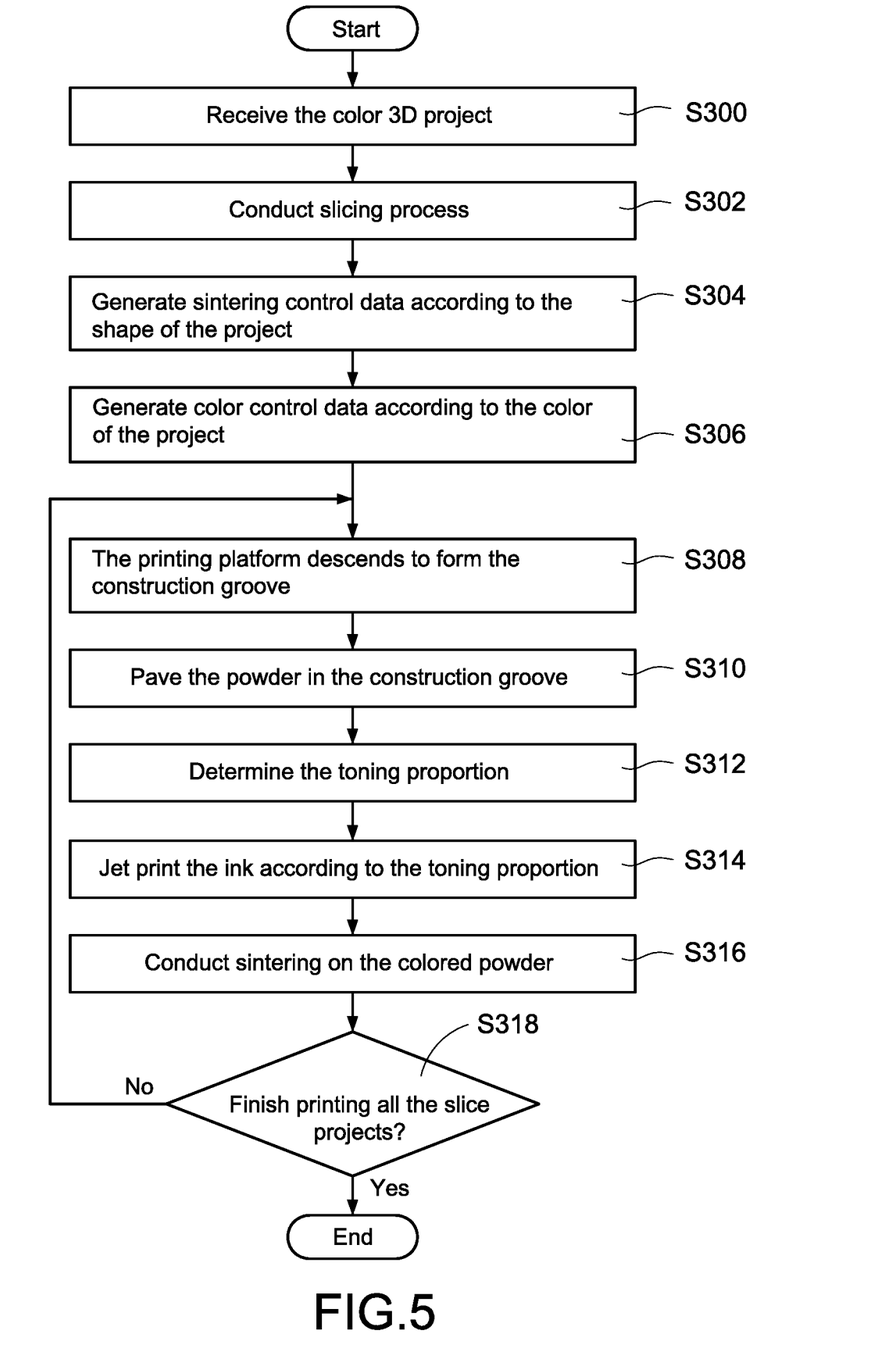
FIG. 5 is the flow chart of the method of slicing printing color 3D object in the third embodiment of the present disclosed example.
Figure 6A:
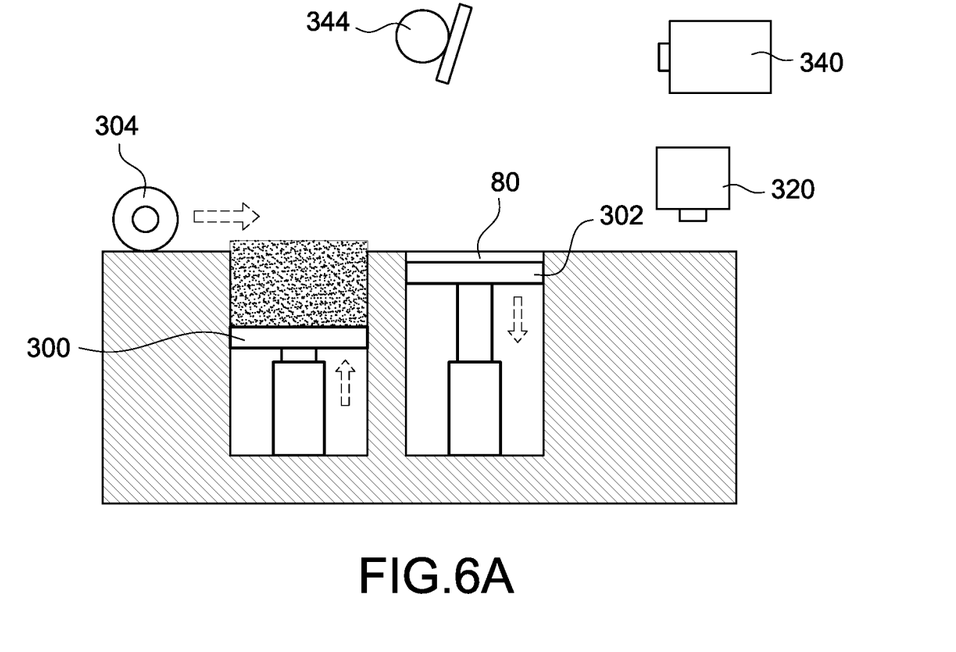
FIG. 6A is the first printing schematic diagram of an embodiment of the present disclosed example.
Figure 6B:
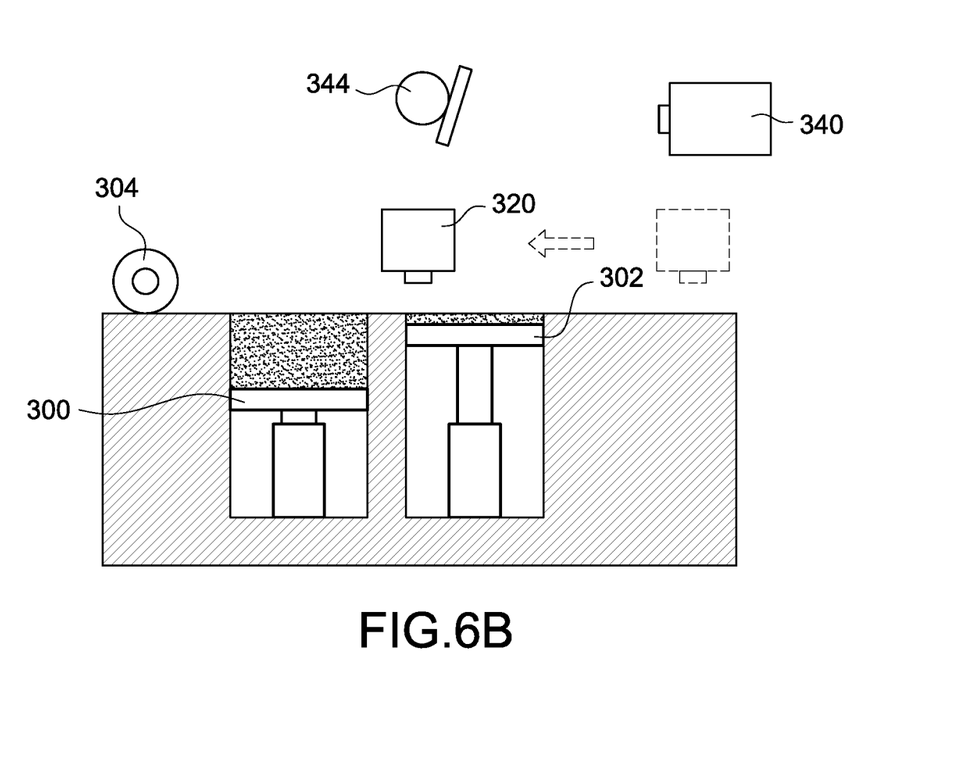
FIG. 6B is the second printing schematic diagram of an embodiment of the present disclosed example.
Figure 6C:
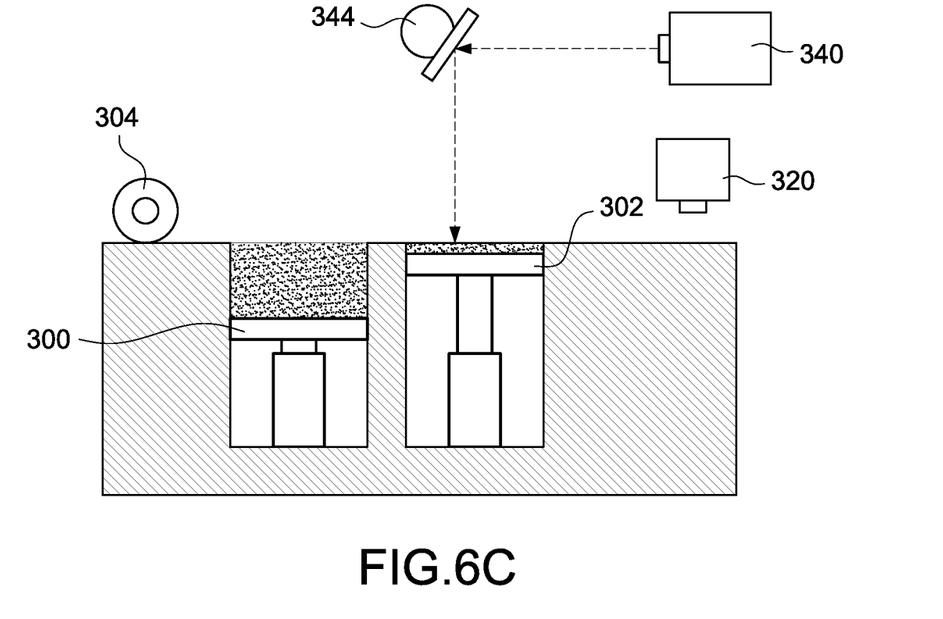
FIG. 6C is the third printing schematic diagram of an embodiment of the present disclosed example.
Figure 6D:
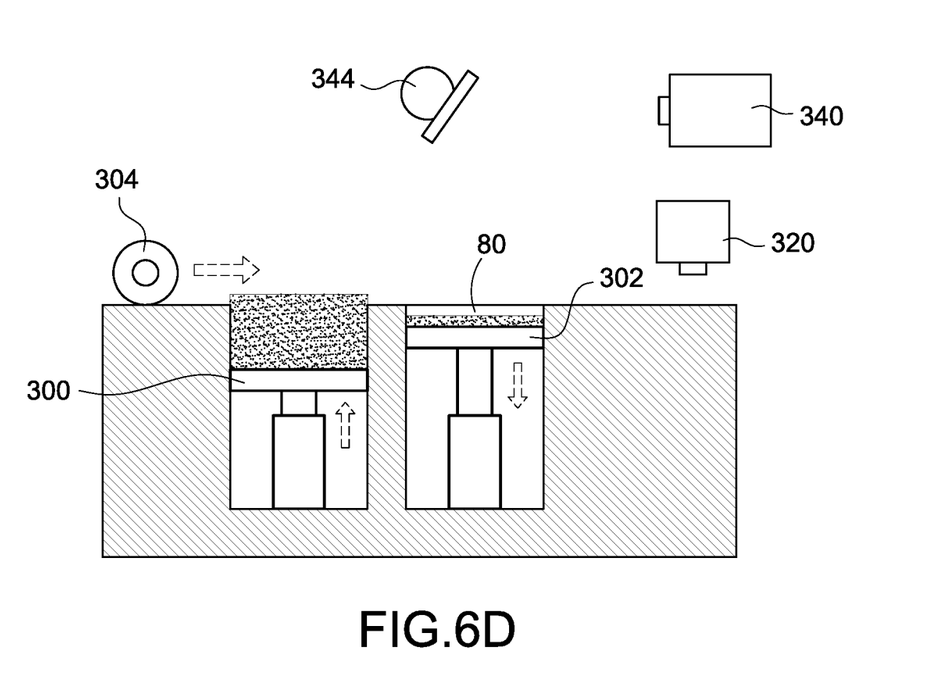
FIG. 6D is the fourth printing schematic diagram of an embodiment of the present disclosed example.

Please go on to refer to FIG. 5 and FIG. 6A to FIG. 6D. FIG. 5 is the flow chart of the method of slicing printing color 3D object in the third embodiment of the present disclosed example, FIG. 6A is the first printing schematic diagram of an embodiment of the present disclosed example, FIG. 6B is the second printing schematic diagram of an embodiment of the present disclosed example, FIG. 6C is the third printing schematic diagram of an embodiment of the present disclosed example, and FIG. 6D is the fourth printing schematic diagram of an embodiment of the present disclosed example. The method of slicing printing color 3D object shown in the third embodiment of FIG. 5 is implemented in 3D printer 3 shown in FIG. 2, and comprises the following steps.

Step S300: electronic device 4, to receive the color 3D object.

Step S302: electronic device 4, to execute slicing process on the color 3D object.

Step S304: electronic device 4, to generate sintering control data according to the object shapes of the plurality of layers of slice objects.

Step S306: electronic device 4, to generate color control data according to the object colors from the plurality of layers of slice objects.

Then, electronic device 4 transmits the generated sintering control data and color control data to 3D printer 1. After 3D printer 3 receives the sintering control data and color control data, then it can enter printing-embodiment automatically, and execute the following 3 steps.

Step S308: control module 36 of 3D printer 3 controls printing platform 302 to descend to form the construction area 80 (shown on FIG. 6A).

Step S310: control module 36 controls powder-storing groove 300 to elevate to provide a layer of powder, and controls powder-pushing devise 304 to push the layer of powder into construction area 80. Via this, 3D printer 3 is able to pave powder in construction area 80.

Step S312: control module 36 determines toning proportion according to the color control data. In an example, control module 36 inquires the object color of the current printing slice object from the color control data, and decides to store in the plural cartridge according to the inquired object color.

Step S314: control module 36 controls plural print head 320 according to the toning proportion, and prints various inks onto the layer of powder to make the layer of powder absorb the printed ink and color completely (Shown on FIG. 6B).

Step S316: control module 36 controls laser transmitter 340 to transmit laser, and controls galvanometer module 344 to switch the angle to control the projection position of laser to sinter the layer of powder and form a layer of color slice physical model 70 according to the sintering control data (Shown on FIG. 6C).

Step S318: control module 36 determines whether all the plural slicing objects have been printed. If control module 16 determines that the printing is unfinished, then execute step S308 to S316 again. As FIG. 6D shows, control module 36 controls printing platform 302 to descend to form construction area 80 again on the color slice physical model. Control powder-storing groove 300 elevates to provide another layer of powder, and controls powder-pushing devise 304 to push the layer of powder into construction area 80.

If control module 36 determines that the plurality of layers of slice object has finished printing, then it can control residual powder cleaning module 302 to remove residual powder on the printing platform 302 (such as wind pressure or water washing), and control 3D printer 3 to end the printing.

What is worth mentioning, although the embodiment illustrates with the example in which colors and then sinters, it should not limit the scope of the present disclosed example. Persons in the art can also refer to the second embodiment of FIG. 4 to revise the embodiment to: sinter and then color (That is, implement Step S316 and then implement S312-S314).

Figure 7A:
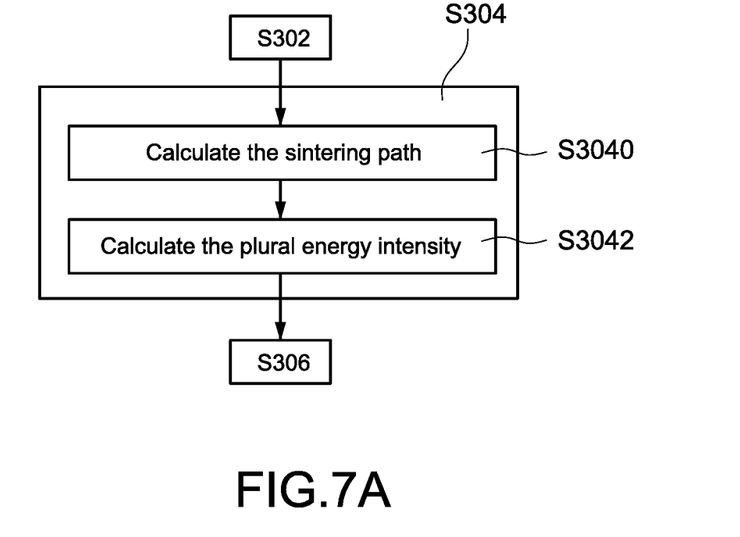
FIG. 7A is the first part of the flow chart of the method of slicing printing color 3D object in the fourth embodiment of the present disclosed example.
Figure 7B:
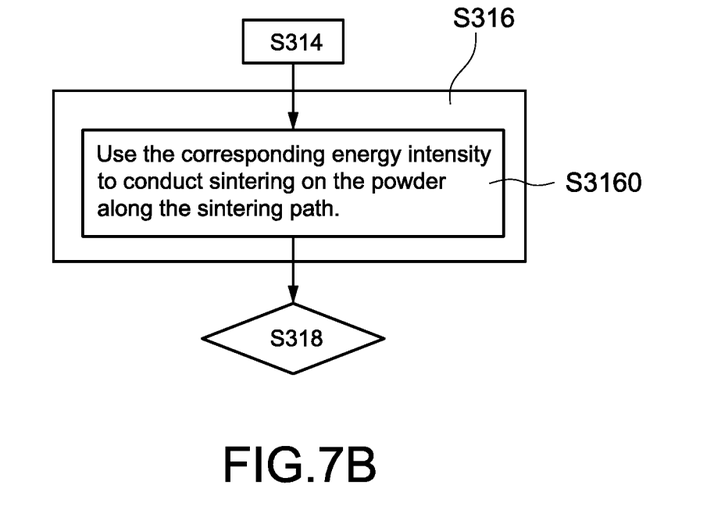
FIG. 7B is the second part of the flow chart of the method of slicing printing color 3D object in the fourth embodiment of the present disclosed example.

Please go on to refer to FIG. 7A and FIG. 7B. FIG. 7A is the first part of the flow chart of the method of plurality of layers of slice object in the fourth embodiment of the present disclosed example; FIG. 7B is the second part of the flow chart of the method of slicing printing color 3D object in the fourth embodiment of the present disclosed example. Compared with the third embodiment in FIG. 5, this embodiment further describes Step S3040 and Step S3042 included in Step S304, and Step 3160 included in Step 316

Step S3040: control module 36 calculates the sintering path according to the printing sequence (i.e., top down) of the plurality of layers of slice object and all the object shapes of the slice objects, and records the sintering path in the sintering control data.

Step S3042: control module 36 calculates the energy intensity corresponding to the slice object according to object colors of every slice object. In an example, energy intensity is proportionate to the darkness of the object colors of the corresponded slice objects.

Step S3160: control module 36 controls power control module 342 to adjust the output power according to the power intensity of the current corresponded printed slice object, and controls galvanometer module 344 to continually vary the projection position to sinter powder along the sintering path.

What is worth mentioning is that laser transmits thermal via light, and absorbance is related to color. Therefore, darker objects with higher absorbance tend to warm easily.

The embodiment calculates the energy intensity of printing the slicing object in advance by basing the object color of the slice object, which can effectively avoid printing failure resulting from the lack of output power of laser, which leads to the inability to melt powder, and minimize the consumption power to conserve power effectively.

Figure 8:
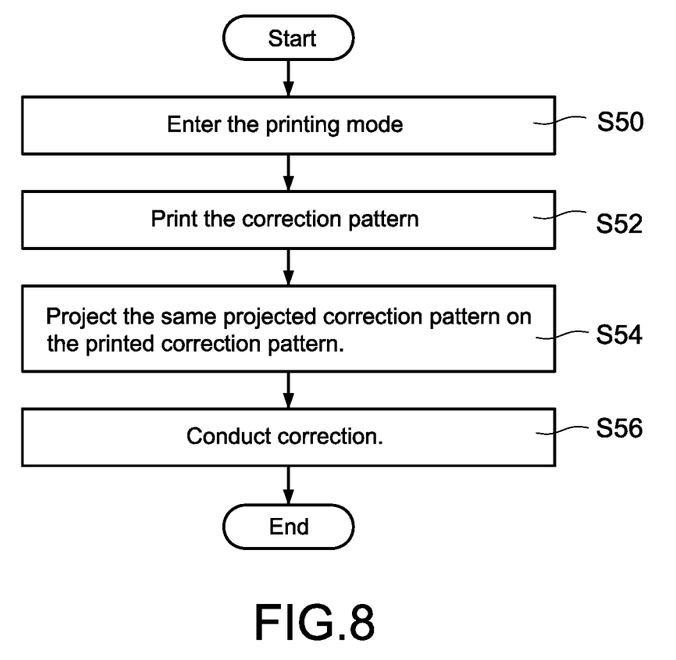
FIG. 8 is the flow chart of correction of the method of slicing printing color 3D object in the fifth embodiment of the present disclosed example.
Figure 9A:
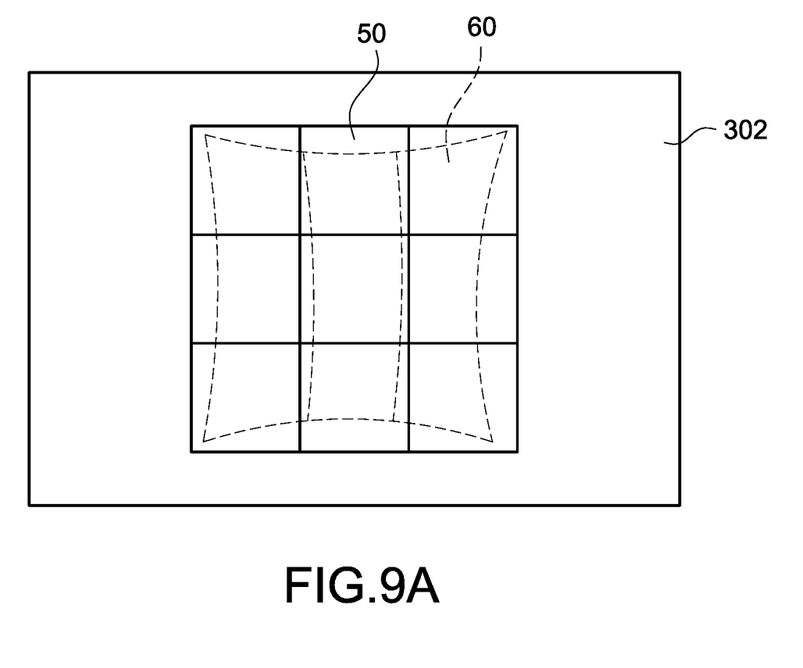
FIG. 9A is the first schematic diagram of correction of an embodiment of the present disclosed example.
Figure 9B:
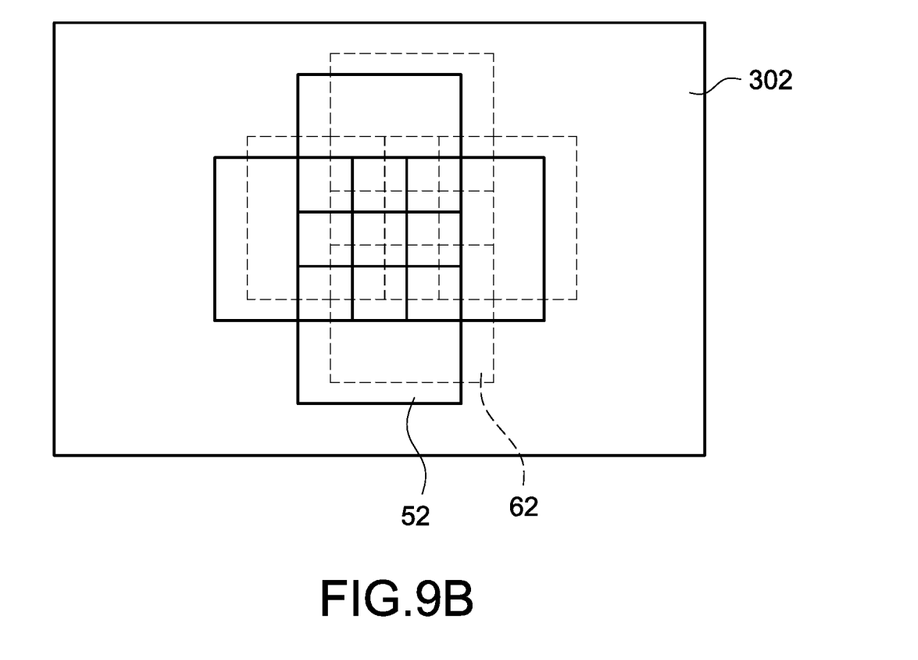
FIG. 9B is the second schematic diagram of correction of the present disclosed example.

What is worth mentioning is that though in the embodiment, sintering is executed according to the sintering path and energy intensity at the same time, it should not limit the scope of the present disclosed example. Persons in the art can also depend on their needs and revise the embodiment into executing sintering simply according to the sintering path or energy intensity FIG. 8 is the correction flow chart of the method of slicing printing color 3D object in the fifth embodiment of the present disclosed example. FIG. 9A is the first correction schematic diagram of the preferred embodiment of the present disclosed example. FIG. 9B is the second correction schematic diagram of the preferred embodiment of the present disclosed example. The embodiment precisely executes interaction to generate color 3D physical model by controlling color jet printing module 32 and laser module 34. Once there is an error between the printing position of color printing module 32 and the projection position of laser module 34, printing failed. To solve the above-mentioned problem, the embodiment has the correction function, able to detect and correct the previously mentioned errors to avoid printing failure. The mentioned correction function can be implemented in the previously mentioned 3D printer 1 or 3D printer 3. The following will simply explain 3D printer 3.

Step S50: control module 36 controls 3D printer 3 into the correction mode. Ideally, control module 36 is able to enter correction mode before or after printing, or enter correction mode according to the user's operation.

Step S52: control module 36 acquires a set of correction patterns, and controls the color jet printing module to print the correction pattern on the specific position of the printing platform 302. (printed correction pattern 50 in FIG. 9A)

Step S54: control module 36 controls laser module 34 to project the same correction pattern on the printing correction pattern 50 (projected correction pattern 60 in FIG. 9A).

What's worth mentioning is that when there is an error between the printing position of color jet printing module 32 and the projection position of laser module 34, even the color jet printing module 32 and laser module 34 execute printing and projection based on the same correction pattern, because of the above-mentioned error, printing correction pattern 50 and projecting correction pattern 60 do not be overlapped completely.

Step S56: control module 36 executes correction on color jet printing module 32 or laser module 34 according to printed correction pattern 50 and projected correction pattern 60.

In an example, control module 36 is to control image capture module 384 to execute shooting on the printing platform 302 to acquire the comparison images of the printed correction pattern 50 and projected correction pattern 60. Then control module 36 executes printing correction on laser jet printing module 32 or laser module 34 according to the comparison image (such as correcting printing margin, printing datum mark, projected margin, or projected datum mark), and exits the correction mode.

With this, the implement can effectively calculate and eliminate the error between the printing position of color jet printing module 32 and projecting position of laser module 34.

What is worth mentioning is that although the embodiment executes only one correction on color jet printing module 32 and laser module 34 once, it should not limit the scope of the present disclosed example.

In another embodiment, control module 36 executes multiple corrections repeatedly on color jet printing module 32 and laser module 34. Taking correcting twice for example, control module 36 can acquire another correction pattern after the first correction (the fineness of this correction pattern is better, and should be finer than that of the previous one.), and controls the color jet printing module to print the correction pattern (printed correction pattern 52 on FIG. 9B). Control laser module 34 projects the same correction pattern on the printed correction pattern 52 (printed correction pattern 62 on FIG. 9B), and executes the second correction on color jet printing module 32 or laser module 34 according to printed correction pattern 52 and projected correction pattern 62.

By implementing multiple correction patterns with different fineness, the embodiment executes multiple corrections in sequence, which can calculate more precisely and eliminate the error between the printing position of color jet printing module 32 and the projection position of laser module 34.

Figure 10:
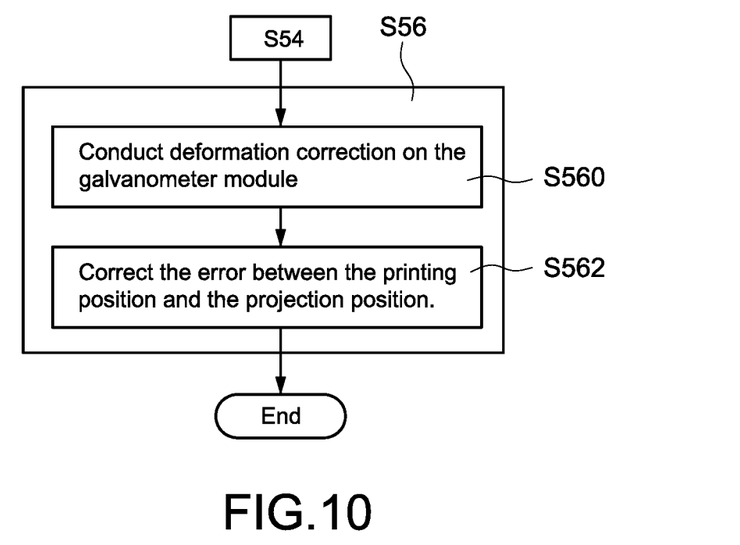
FIG. 10 is the partial flow chart of correction of the method of slicing printing color 3D object in the sixth embodiment of the present disclosed example.

Please go on to refer to FIG. 10, which is the partial correction procedure of the method of slicing printing color 3D object in the sixth embodiment.

The difference between the embodiment and the fifth embodiment shown in FIG. 8 is that step S56 in the embodiment comprises the following steps.

Step S560: control module 36 executes deformation correction on galvanometer module 344 according to the offset between printed correction pattern 50 and projected correction pattern 60.

Step S562: control module 36 calculates the error between the printing position of print head 320 and the projection position of galvanometer module 344 according to the previously mentioned offset, and executes correction on the error.

By executing correction on deformation and position respectively, the embodiment can precisely calculate and eliminate the error between the printing position and the projection position.

Definitely, the present disclosed example can still have other various modes. Under the condition that the spirit and essence of the present disclosed example do not deviate, persons in the art can make various corresponding variations and deformations according to the present disclosed example, but both the corresponding variations and deformations should belong to the protection scope of the affiliated claims of the present disclosed example.

What is claimed is:

1. A method of slicing printing a color 3D (three-dimensional) object used in a color 3D printing system, the color 3D printing system comprising a powder-paving module, a color jet printing module, and a laser module, the method comprising:
    a) executing a slicing process on the color 3D object to obtain a plurality of layers of slice objects;
    b) analyzing the plurality of layers of the slice objects and generating sintering control data and color control data corresponding to the plurality of layers of the slice objects;
    c) controlling the powder-paving module to pave a layer of powder;
    d) according to the sintering control data, controlling the laser module to sinter the layer of powder for generating a slice physical model;
    e) according to the color control data, controlling the color jet printing module to color the slice physical model being generated to complete printing one layer of the slice object;
    f) repeating Step c) to Step e) until printing of the plurality of the slice objects is completed; and
    g) retrieving a first pattern as a correction pattern to execute a correction procedure;
    wherein the correction procedure comprises:
    h1) controlling the color jet printing module to print a printed correction pattern on a printing platform according to the correction pattern;
    h2) controlling the laser module to project a projected correction pattern on the printed correction pattern, wherein the projected correction pattern and the printed correction pattern are the same;
    h3) executing deformation correction on a galvanometer module on the laser module according to an offset between the printed correction pattern and the projected correction pattern for correcting a printing margin or a printing datum mark of the laser module; and
    h4) correcting an error between a printing position of the color jet printing module and a projection position of the laser module according to the offset for correcting a projected margin, or a projected datum mark of the color jet printing module, wherein the printed correction pattern printed by the color jet printing module after correction and the projected correction pattern projected by the laser module after correction overlap completely.

2. The method of slicing printing the color 3D object of claim 1, wherein Step b) comprises following steps:
    b1) generating the sintering control data according to the object shapes of the plurality of layers of the slice objects; and
    b2) generating the color control data according to the object colors of the plurality of layers of the slice objects.

3. The method of slicing printing the color 3D object of claim 2, wherein the sintering control data comprise a sintering path; Step b1) comprises Step b11) calculating the sintering path according to a printing sequence and the object shapes of the plurality of layers of the slice objects.

4. The method of slicing printing color the 3D object of claim 3, wherein the step d) comprises step d1) controlling the laser module to sinter the layer of powder along the sintering path.

5. The method of slicing printing the color 3D object of claim 1, wherein, before step c), step c0) comprises: controlling the printing platform of the color 3D printing system to descend to form a construction area; Step c) paving the layer of powder in the construction area.

6. The method of slicing printing the color 3D object of claim 1, wherein Step e) comprises the following steps:
    e1) determining a toning proportion according to the color control data, wherein the toning proportion corresponds to an object color of the current printed slice object, and
    e2) jet printing different colors of ink on the slice physical model to complete coloring according to the toning proportion.

7. The method of slicing printing the color 3D object of claim 1, further comprising:
    i) after the step g), retrieving a second pattern as the correction pattern to execute the correction procedure again, wherein a fineness of the second pattern is better than a fineness of the first pattern.

\* \* \* \* \*